Patented June 12, 1934

1,962,478

UNITED STATES PATENT OFFICE 1,962,478

DRIER FOR OILS, PAINTS, AND VARNISHES

Herman A. Bruson, Philadelphia, Pa., Jack D. Robinson, Audubon, N. J., and Otto Stein, Philadelphia, Pa., assignors to Resinous Products & Chemical Co. Inc., a corporation of Delaware No Drawing. Application August 28, 1930, Serial No. 478,564

14 Claims. (Cl. 134—57)

This invention relates to new siccatives for drying oils, and paints, oil varnishes, and coating compositions prepared therefrom.

More specifically it pertains to polyvalent metal salts of certain monobasic, ketonic acids, said acids having the general formula:

where R represents any aromatic nucleus; "$n$" is a whole number between 2 and 8 inclusive, and "$y$" is a value equal to 0 (zero) or 2. The expression "polyvalent metal" as used herein, is understood to comprise a group of metals consisting principally of cadmium, cobalt, manganese, cerium, lead, iron, nickel, vanadium and uranium, but including in a broad sense, other metallic elements such as aluminum, barium, calcium, chromium, copper, mercury, strontium, tin, and zinc; these latter metals, in the form of their above salts, functioning as siccatives to a lesser degree than those of the first mentioned group of metals.

Typical compounds which belong to the above class are the polyvalent metallic salts of the following acids; new substances, the preparation of which is described later herein:

1. $n=2$ (sec-amyl benzoyl-propionic acid)
   $y=0$ (sec-octyl toluyl-propionic acid)
2. $n=2$ (sec-amyl-benzoyl-acrylic acid)
   $y=2$ (sec-octyl-xyloyl-acrylic acid)
3. $n=4$ (n-butyl benzoyl-valeric acid)
   $y=0$ (sec-butyl-naphthoyl-valeric acid)
4. $n=8$ (sec-amyl-benzoyl-nonylic acid)
   $y=0$ (sec-octyl-toluyl-nonylic acid)

The above acids are readily prepared by condensing a suitable aromatic hydrocarbon with the anhydride of an aliphatic dibasic acid, using preferably anhydrous aluminum chloride as the condensing agent. For example the acids shown above were prepared as follows:

1. (Sec-amyl-benzoyl-propionic acid. From sec-amyl benzene and succinic anhydride)
   (Sec-octyl-toluyl-propionic acid. From sec-octyl-toluene and succinic anhydride)
2. (Sec-amyl-benzoyl-acrylic acid. From sec-amyl benzene and maleic anhydride)
   (Sec-octyl-xyloyl-acrylic acid. From sec-octyl xylene and maleic anhydride)
3. (n-butyl benzoyl-valeric acid. From n-butyl benzene and adipic anhydride)
   (Sec-butyl-naphthoyl-valeric acid. From sec-butyl naphthalene and adipic anhydride)
4. (Sec-amyl benzoyl-nonylic acid. From sec-amyl benzene and sebacic anhydride)
   (Sec-octyl toluyl-nonylic acid. From sec-octyl toluene and sebacic anhydride)

It is apparent that numerous homologues and isomers of these acids can be prepared by condensing other aromatic hydrocarbons with anhydrides of other aliphatic dibasic acids.

The polyvalent metal salts of the above acids and/or their isomers and homologues, all of which belong to a class of ketonic acids having the general formula shown above, are unique in that they form resinous masses which are readily soluble in a great variety of organic solvents, such as toluene, turpentine, butyl acetate and glycol monoethyl ether. They also disperse in the drying and semi-drying oils such as linseed, tung, soya bean, perilla, rape seed, and the like. When dispersed in drying oils for example in raw linseed oil, the cobalt, cadmium, manganese, iron, vanadium, nickel, cerium, uranium and lead salts, of the above acids exert a marked drying action, which is due to catalytic oxidation brought about by their presence. Thus the addition of the cobalt, manganese or vanadium salt of octyl benzoyl-acrylic acid dispersed in an amount equal to .05% metal upon the weight of linseed oil, will decrease the drying time of the oil from about 24 hours to 8 hours. The other polyvalent metal salts mentioned above also exert a catalytic drying action.

We have found that the degree of solubility of the polyvalent metal salts of the above acids, in oils and in varnish thinners such as turpentine or mineral spirits is dependent upon the nature of the aromatic nucleus R and the value of "$n$" in the above general formula. The solubility in oils and hydrocarbon solvents increases as the length of the alkyl side chain attached to the nucleus R increases; also as the molecular weight of the group R increases and as the value of "$n$" increases. Thus the polyvalent metal salts of sec-octyl benzoyl propionic acid are more soluble in turpentine and linseed oil than the corresponding salts of sec-butyl benzoyl-propionic acid; and the salts of sec-octyl-nonylic acid are more soluble than the salts of sec octyl valeric acid.

As illustrating the manner of preparing these acids and their salts and their incorporation in oils, the following examples are given:

Example 1

100 grams succinic anhydride were mixed with 875 grams of sec-amyl benzene and 295 grams of anhydrous aluminum chloride added in small portions at a time, keeping the temperature below 25° C. and stirring continuously. When the evolution of hydrogen chloride slackens the mixture is warmed to 50° C. for 5–6 hours until no more hydrogen chloride comes off. The reaction product is then decomposed by running it into a hot solution of excess sodium carbonate. The excess hydrocarbon is steam-distilled off, and the residue filtered to remove alumina. The filtrate upon acidification with dilute sulphuric acid forms a waxy precipitate consisting of crude sec-amylbenzoyl-propionic acid.

The wax is washed with hot water to remove traces of water-soluble material, and is then carefully neutralized with a 10% solution of sodium hydroxide until exactly neutral to phenolphthalein indicator. An excess of cobalt sulfate solution is then added whereupon a blue, heavy, waxy precipitate of cobalt-amyl-benzoyl-propionate comes down. The salt may be washed and dried or it may be dissolved in an organic solvent such as toluene or ethylene dichloride; filtered, and the organic solvent evaporated off. The cobalt salt forms a blue powder, readily soluble in toluene, turpentine and dispersable in drying oils.

By using a water-soluble salt of a polyvalent metal other than cobalt, such as lead nitrate, managanous chloride, vanadium nitrate, nickel chloride, cerium nitrate, and the like, the corresponding polyvalent metal salts of sec-amyl-benzoyl-propionic acid may be obtained. They are all soluble in organic solvents such as acetone.

Instead of sec-amyl benzene, one may use n-amyl benzene, tertiary amyl benzene, or other isomeric amyl benzene, or mixtures thereof in the above condensation.

By using 900 grams of sec-octyl benzene in the above condensation, and proceeding in an exactly analogous manner, the corresponding crude sec-octyl-benzoyl propionic acid is obtained as a yellowish wax. By dissolving this wax in 10% potassium hydroxide solution until exactly neutral to phenolphthalein and adding a water soluble salt of a polyvalent metal, the corresponding polyvalent metal salt of sec-octyl-benzoyl-propionic acid is obtained. The cobalt and copper salts form blue powders, the mercury salt is yellow, the vanadium salt is brown, the manganese salt is flesh colored, the iron salt is red, the aluminum, zinc and calcium salts are white. All are readily soluble in acetone.

Example 2

98 grams maleic anhydride were mixed with 875 grams sec-amylbenzene and 295 grams of anhydrous aluminum chloride added in small portions keeping the temperature at 25–30° C. The mixture was then warmed to 50° C. with stirring and kept thereat until evolution of hydrogen chloride ceased. The reaction product was then run into ice-water to decompose the aluminum complex. The mixture was then steam distilled from dilute hydrochloric acid solution to remove the excess amyl-benzene. The residue is filtered and the oily material is exactly neutralized with a cold 10% solution of sodium hydroxide. The solution of sodium amyl benzoyl-acrylate thereby obtained is treated with excess of an aqueous solution of a water soluble heavy metal salt such as cobalt acetate, aluminum sulphate, zinc chloride, lead acetate, copper sulfate, manganese chloride, etc. and the precipitate of polyvalent metal salt is taken up in ethylene dichloride. The water layer is run off and the ethylene dichloride layer is washed and filtered. The ethylene dichloride is then removed by steam distillation. The residue is dried in vacuo at 100° C.

The polyvalent metal salts of amyl-benzoyl-acrylic acid have greater solubility in turpentine and in oils than the corresponding salts of amyl benzoyl-propionic acid.

By using 900 gr. of sec-octyl xylene in the above condensation in place of the sec-amyl benzene, the corresponding crude sec-octyl xyloyl-acrylic acid is obtained as a resinous mass. Its polyvalent heavy metal salts prepared as above are even more soluble in drying oils than the salts of amyl-benzoyl-acrylic acid.

Example 3

128 grams adipic anhydride are mixed with 650 grams of normal butyl benzene and 275 grams anhydrous aluminum chloride added while stirring. The mixture is heated to 55° C. on an oil bath until hydrogen chloride is no longer evolved. The reaction product is decomposed with a hot solution of sodium carbonate and the excess of butyl benzene is steam distilled off. The residue is filtered, and the filtrate acidified with dilute hydrochloric acid. A resinous mass of crude n-butyl benzoyl-valeric acid is precipitated. The mass is washed with hot water, and then exactly neutralized with a 10% solution of sodium hydroxide. The solution is filtered and treated with a water solution of a salt of a polyvalent metal such as cobalt nitrate, chrome alum, tin chloride, cadmium chloride, nickel chloride, manganese acetate, lead nitrate, and the like. A heavy precipitate of the corresponding polyvalent metal salt of n-butyl benzoyl-valeric acid is formed. These salts when dry are readily soluble in drying oils, toluene, turpentine and other organic solvents.

Instead of n-butyl benzene, one may employ 900 grams of sec-butyl naphthalene in the above condensation. There is obtained sec-butyl-naphthoyl-valeric acid whose polyvalent metal salts are soluble in acetone and capable of being readily dispersed in drying oils.

Example 4

194 grams of sebacic anhydride are condensed with 850 grams of sec-amyl benzene as described in Example 3, using 275 grams anhydrous aluminum chloride as condensing agent. The crude sec-amyl benzoyl-nonylic acid obtained forms a waxy mass which is converted into its polyvalent metal salts as described above.

Example 5

By using more than one, but not more than two molal equivalents of an alkaline hydroxide solution, such as sodium hydroxide or potassium hydroxide, for neutralizing the organic acids of the type described above, and thereafter treating the mixture with a water-soluble salt of a polyvalent metal, the corresponding basic salts are obtained according to the following reaction:

$$R-CO-(C_nH_{2n-y})-COOH + 2NaOH + CoSO_4$$
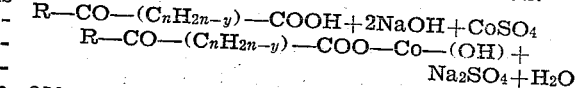
$$R-CO-(C_nH_{2n-y})-COO-Co-(OH) +$$
$$Na_2SO_4 + H_2O$$

250 grams of sec octyl-benzoyl-propionic acid are exactly neutralized with a 20% aqueous solution of sodium hydroxide using phenolphthalein as an indicator. A like quantity of the same strength sodium hydroxide solution is then added. One molal equivalent of excess alkali is thus present in the solution. 500 cc. of ethylene dichloride are then added and excess of a 20% aqueous solution of cobalt chloride run in with stirring. The basic cobalt salt dissolves in the ethylene dichloride layer from which it is recovered by evaporating off the solvent. It forms a blue powder, soluble in acetone. Similarly the basic polyvalent metal salts of the other acids belonging to the above described class may be obtained.

Instead of the acids given above their isomers and homologues may be used. Instead of the anhydrides mentioned, other anhydrides of dibasic acids such as glutaric anhydride, pimelic anhydride, suberic anhydride, and azelaic anhydride may be used.

The polyvalent metal salts showing the optimum solubility and stability in oils and hydrocarbons are those derived from acids of the formula $$R-CO-(C_nH_{2n-y})-COOH$$

where R is an alkylated benzene ring in which the alkyl side chain contains at least four carbon atoms in a normal straight chain, where "$n$" is a whole number between 2 and 8 inclusive, and "$y$" is equal to 0 (zero) or 2 as illustrated by the typical salts given above.

Salts of this type may function as drying agents in paints and varnishes, or as catalytic agents in carrying out other chemical reactions, as for example, oxidation.

As an example of the use of one of these salts as a drier in varnish, the following example is typical

| | | |
|---|---|---|
| China wood oil | 40 | gallons |
| Linseed oil | 10 | gallons |
| Rosin | 96 | lbs. |
| Turpentine | 100 | gallons |
| Cobalt sec-amyl benzoyl nonylate | 1.5 | lbs. |

Such a varnish shows satisfactory drying properties.

The hereindescribed salts may also be incorporated in cellulosic lacquers such as those containing nitro-cellulose. They are completely soluble in most of the common lacquer solvents and give clear films in conjunction with nitrocellulose, serving therein as so-called "lacquer gums" to promote adhesion, hardness and gloss.

It is understood that the basic polyvalent metal salts as well as the neutral polyvalent metal salts of the above described acids are included herein under the general term "polyvalent metal salts." By the expression "drying oil type composition" wherever it appears in the following claims is meant a material of the following type, oils, paints, varnishes, resin compositions and the like.

What we claim is:

1. In the process of accelerating the rate of drying of autoxidizable, drying oil coating compositions, the step which comprises incorporating therein a polyvalent metal salt of a monobasic, ketonic acid having the formula $$R-\overset{O}{\underset{\|}{C}}-(C_nH_{2n-y})-COOH$$

where R represents an aromatic nucleus, "$n$" a whole number between 2 and 8 inclusive, and "$y$" a value of zero or 2.

2. In the process of accelerating the rate of drying of autoxidizable, drying oil coating compositions, the step which comprises incorporating therein as a siccative, a metal salt of a monobasic, ketonic acid having the formula $$R-\overset{O}{\underset{\|}{C}}-(C_nH_{2n-y})-COOH$$

where R represents an aromatic nucleus, "$n$" a whole number between 2 and 8 inclusive, and "$y$" a value of zero or 2; the metal radicle of which is a member of the group consisting of cobalt, lead and manganese.

3. In the process of accelerating the rate of drying of autoxidizable, drying oil coating compositions, the step which comprises incorporating therein a heavy metal salt of a monobasic, ketonic acid having the formula $$R-\overset{O}{\underset{\|}{C}}-(C_nH_{2n-y})-COOH$$

where R represents an aromatic nucleus, "$n$" a whole number between 2 and 8 inclusive, and "$y$" a value of zero or 2.

4. In the process of accelerating the rate of drying of autoxidizable, drying oil coating compositions, the step which comprises incorporating therein a polyvalent metal salt of a monobasic ketonic acid having the formula $$R-\overset{O}{\underset{\|}{C}}-(C_nH_{2n-y})-COOH$$

where R represents an aromatic nucleus bearing at least one alkyl side chain substituent, "$n$" is a whole number between 2 and 8 inclusive, and "$y$" is a value of zero or 2.

5. In the process of accelerating the rate of drying of autoxidizable, drying oil coating compositions the step which comprises incorporating therein a polyvalent metal salt of a monobasic ketonic acid having the formula $$R-\overset{O}{\underset{\|}{C}}-(C_nH_{2n-y})-COOH$$

where R represents a benzene nucleus bearing at least one alkyl side chain substituent, "$n$" is a whole number between 2 and 8 inclusive, and "$y$" is a value of zero or 2.

6. In the process of accelerating the rate of drying of autoxidizable, drying oil coating compositions, the step which comprises incorporating therein a polyvalent metal salt of a monobasic ketonic acid having the formula $$R-\overset{O}{\underset{\|}{C}}-(C_nH_{2n-y})-COOH$$

where R represents a benzene nucleus bearing at least one alkyl side chain substituent having at least four carbon atoms, "$n$" is a whole number between 2 and 8 inclusive, and "$y$" is a value of zero or 2.

7. In the process of accelerating the rate of drying of autoxidizable, drying oil coating compositions, the step which comprises incorporating therein a heavy metal salt of an acid of the group consisting of amyl-benzoyl-propionic, amylbenzoyl-acrylic, butylbenzoyl-valeric, butyl-naphthoyl-valeric, amylbenzoyl-nonylic, octyl-benzoyl-propionic, and octyltoluyl-propionic.

8. A coating composition which contains a drying oil and a polyvalent metal salt of a monobasic ketonic acid having the formula $$R-\overset{O}{\underset{\|}{C}}-(C_nH_{2n-y})-COOH$$

wherein R is an aromatic nucleus, "$n$" is a whole number between 2 and 8 inclusive, and "$y$" is a value of zero or 2.

9. A coating composition which contains a drying oil and, as a siccative, a heavy metal salt of a monobasic ketonic acid having the general formula $$R-\overset{O}{\underset{\|}{C}}-(C_nH_{2n-y})-COOH$$

wherein R is an aromatic nucleus, "$n$" is a whole number between 2 and 8 inclusive, and "$y$" is a value of zero or 2.

10. A coating composition which contains a drying oil and, as a siccative, a metal salt of a monobasic ketonic acid having the formula $$R-\overset{O}{\underset{\|}{C}}-(C_nH_{2n-y})-COOH$$

wherein R is an aromatic nucleus, "$n$" is a whole number between 2 and 8 inclusive, and "$y$" is a value of zero or 2; the metal radicle of which is a member of the group consisting of cobalt, manganese, and lead.

11. A coating composition containing a drying oil and a heavy metal salt of the ketonic acids obtainable from the condensation of an aromatic hydrocarbon with anhydrous aluminum chloride and the anhydride of a dicarboxylic acid of the aliphatic series having from 4 to 10 carbon atoms inclusive.

12. A coating composition containing a drying oil and, as a siccative, a metal salt of amylbenzoyl-propionic acid, the metal radicle of which is a member of the group consisting of cobalt, manganese, and lead.

13. A coating composition containing a drying oil and, as a siccative, a metal salt of amylbenzoyl-acrylic acid, the metal radicle of which is a member of the group consisting of cobalt, manganese, and lead.

14. A coating composition containing a drying oil and, as a siccative, a metal salt of amylbenzoyl-valeric acid, the metal radicle of which is a member of the group consisting of cobalt, manganese, and lead.

HERMAN A. BRUSON.
JACK D. ROBINSON.
OTTO STEIN.